United States Patent
Uchino et al.

(10) Patent No.: US 9,986,536 B2
(45) Date of Patent: May 29, 2018

(54) MOBILE STATION FOR UPLINK CARRIER AGGREGATION USING COMPONENT CARRIERS

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP); Kohei Kiyoshima, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 472 days.

(21) Appl. No.: 14/415,847

(22) PCT Filed: Jul. 5, 2013

(86) PCT No.: PCT/JP2013/068474
§ 371 (c)(1),
(2) Date: Jan. 20, 2015

(87) PCT Pub. No.: WO2014/013893
PCT Pub. Date: Jan. 23, 2014

(65) Prior Publication Data
US 2015/0189641 A1    Jul. 2, 2015

(30) Foreign Application Priority Data

Jul. 20, 2012  (JP) ................................ 2012-161912

(51) Int. Cl.
*H04W 72/04* (2009.01)
*H04W 52/04* (2009.01)
(Continued)

(52) U.S. Cl.
CPC .......... *H04W 72/0406* (2013.01); *H04L 1/08* (2013.01); *H04L 5/001* (2013.01); *H04L 5/0042* (2013.01);
(Continued)

(58) Field of Classification Search
None
See application file for complete search history.

(56) References Cited

U.S. PATENT DOCUMENTS

2009/0089139 A1* 4/2009 Rojas-Cessa ...... G06Q 10/0631
705/7.12
2009/0196175 A1* 8/2009 Sammour ............. H04W 36/02
370/230.1
(Continued)

FOREIGN PATENT DOCUMENTS

EP          2398181 A2    12/2011
JP       2010-279017 A    12/2010
(Continued)

OTHER PUBLICATIONS

Office Action in counter Japanese Patent Application No. 2012-161912, dated Sep. 13, 2016 (9 pages).
(Continued)

Primary Examiner — Anh Ngoc Nguyen
(74) Attorney, Agent, or Firm — Osha Liang LLP

(57) ABSTRACT

To execute appropriate process when "Time-Switched UL CA" is executed and even when transmission of uplink information using a plurality of CCs has been scheduled in a same TTI. A radio base station eNB according to the present invention includes a UL transmission processing unit 11 configured to transmit uplink information at TTI#n+4 using a CC allocated over a PDCCH to the mobile station UE at TTI#n. The UL transmission processing unit 11 is configured to transmit the uplink information at each of TTIs using only one CC, and when a plurality of CCs is allocated at TTI#n, the UL transmission processing unit 11 is configured to select uplink information to be transmitted at TTI#n+4, based on a priority corresponding to the uplink information to be transmitted using each of the plurality of CCs allocated.

12 Claims, 4 Drawing Sheets

(51) Int. Cl.
  *H04L 5/00*  (2006.01)
  *H04L 1/08*  (2006.01)
  *H04W 72/12* (2009.01)
  *H04L 1/18*  (2006.01)

(52) U.S. Cl.
  CPC ....... *H04W 52/04* (2013.01); *H04W 72/0446* (2013.01); *H04L 1/1816* (2013.01); *H04L 5/0062* (2013.01); *H04W 72/12* (2013.01); *H04W 72/1242* (2013.01)

(56) References Cited

U.S. PATENT DOCUMENTS

| | | | |
|---|---|---|---|
| 2010/0272045 A1* | 10/2010 | Hsu | H04W 72/1252 370/329 |
| 2011/0317642 A1* | 12/2011 | Eravelli | H04L 49/90 370/329 |
| 2011/0319068 A1* | 12/2011 | Kim | H04L 1/1671 455/422.1 |
| 2012/0140708 A1 | 6/2012 | Choudhury et al. | |
| 2012/0230268 A1* | 9/2012 | Marinier | H04W 72/0453 370/329 |
| 2014/0153520 A1 | 6/2014 | Shinohara et al. | |

FOREIGN PATENT DOCUMENTS

| | | |
|---|---|---|
| JP | 2011-142638 A | 7/2011 |
| JP | 2011-166843 A | 8/2011 |
| WO | 2010/016149 A1 | 2/2010 |
| WO | 2010/016151 A1 | 2/2010 |
| WO | 2010/121708 A1 | 10/2010 |

OTHER PUBLICATIONS

International Search Report issued in PCT/JP2013/068474 dated Aug. 6, 2013 (4 pages).
Written Opinion of the International Searching Authority issued in PCT/JP2013/068474 dated Aug. 6, 2015 (10 pages).
NTT DOCOMO; "Discussion on 1CC transmission in a TTI for uplink inter-band carrier aggregation"; 3GPP TSG RAN WG4 Meeting #62bis, R4-121559; Jeju, Koria; Mar. 26-30, 2012 (4 pages).
3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).
Extended Search Report issued in corresponding European Application 13819988.0, dated Mar. 23, 2016 (8 pages).
Office Action issued in corresponding Japanese Application No. 2012-161912, dated Mar. 7, 2017 (9 pages).

* cited by examiner

MOBILE STATION FOR UPLINK CARRIER AGGREGATION USING COMPONENT CARRIERS

TECHNICAL FIELD

The present invention relates to a mobile station.

BACKGROUND ART

A mobile communication system of LTE (Long Term Evolution)-Advance scheme is configured to be able to execute "Uplink CA (Carrier Aggregation)" by using a plurality of CCs (Component Carriers) to transmit uplink information.

However, in a radio configuration for executing a conventional FDD system, a Duplexer is inserted to suppress any interference from an uplink bandwidth to a downlink bandwidth in the same band.

On the other hand, in "Inter-band CA," there occurs interference of signals from an uplink bandwidth transmitted in different bands into a downlink bandwidth in its own band. To suppress the interference, generally, additional insertion of a Diplexer is considered.

For example, in order to suppress interference of signals from an uplink bandwidth to a downlink bandwidth in a band #A/#B (solid line in FIG. 5), a Duplexer #A/#B is inserted.

In addition, for interference of signals from the uplink bandwidth in the band #A/#B to the downlink bandwidth in the band #B/#A (dotted line in FIG. 5), the interference signals can be suppressed similarly by inserting a Diplexer.

However, for interference of signals via the Diplexer from an uplink bandwidth to a downlink bandwidth of different bands, no action has been taken for signals generated from a plurality of uplink bandwidths.

In particular, there is a problem that due to this, transmission spurious, degraded receiving sensitivity, or reduction of transmission power and the like occur.

In order to solve the problem, an approach of "Time-Switched (TS) UL CA" is specified (see Non-patent Document 2, for example).

A mobile station UE which executes "Time-Switched UL CA" is configured to be restricted such that the mobile station UE can transmit uplink information from only one CC at each TTI (Transmission Time Interval).

As shown in FIG. 6, the mobile station UE which executes "Time-Switched UL CA" is configured to switch a CC used to transmit uplink information at every TTI.

Here, in practice, a "switching period" for switching a CC used to transmit uplink information is needed. Note that the "switching period" may be longer than 1 TTI (1 ms).

PRIOR ART DOCUMENT

Non-Patent Document

Non-patent document 1: 3GPP TS36.300
Non-patent document 2: 3GPP R4-121559

SUMMARY OF THE INVENTION

However, the following problems may occur when "Time-Switched UL CA" as described above is executed (see FIG. 7).

As shown in FIG. 7, when a mobile station UE acquires at TTI#n both scheduling information on transmission of uplink information in CC#1 and scheduling information on transmission of uplink information in CC#2 via a PDCCH (Physical Downlink Control Channel), there is a problem that a radio base station eNB cannot execute normal reception processing or interference occurs in the uplink, because the radio base station eNB does not know whether the mobile station UE transmits the uplink information via CC#1 or CC#2 at TTI#n+4.

Thus, the present invention has been made in view of such circumstances and has an objective of providing a mobile station capable of executing appropriate processing when "Time-Switched UL CA" is executed and even when transmission of uplink information using a plurality of CCs has been scheduled in a same TTI.

A first feature of the present invention is summarized as a mobile station configured to be able to carry out carrier aggregation using a plurality of component carriers in an uplink with a radio base station, including: a uplink transmission processing unit configured to transmit uplink information at transmission time intervals. Here, the uplink transmission processing unit is configured to transmit the uplink information at each of the transmission time intervals using only one component carrier, and when transmission of uplink information is triggered in a plurality of component carriers, the uplink transmission processing unit is configured to select uplink information to be transmitted at the transmission time intervals, based on a priority corresponding to the uplink information to be transmitted using each of the plurality of component carriers in which transmission of the uplink information is triggered.

DETAILED DESCRIPTION (Mobile Communication System According to First Embodiment of the Present Invention)

A mobile communication system according to a first embodiment of the preset invention is described with reference to FIGS. 1 to 4.

While in the embodiment, a description is given with a mobile communication system of LTE-Advanced scheme as an example, the present invention is not limited to the mobile communication system and is also applicable to any mobile communication system of other schemes.

Figure 1:
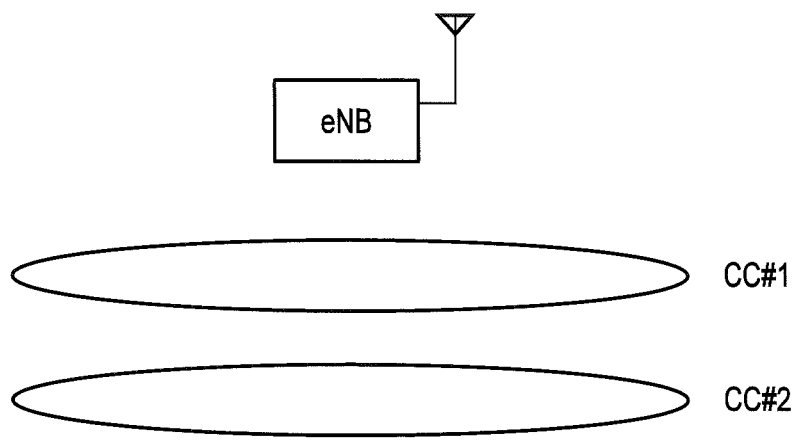
FIG. 1 is an overall configuration diagram of a mobile communication system according to a first embodiment of the present invention.
Figure 1:
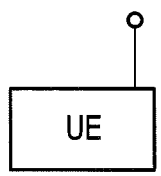

As shown in FIG. 1, the mobile communication system according to the embodiment includes a radio base station eNB configured to manage CC#1 and CC#2, and a mobile station UE.

In the mobile communication system according to the embodiment, the mobile station UE is configured to be able to execute CA using CC#1 and CC#2, more specifically, "Inter-band CA", in the uplink with the radio base station eNB.

Figure 2:
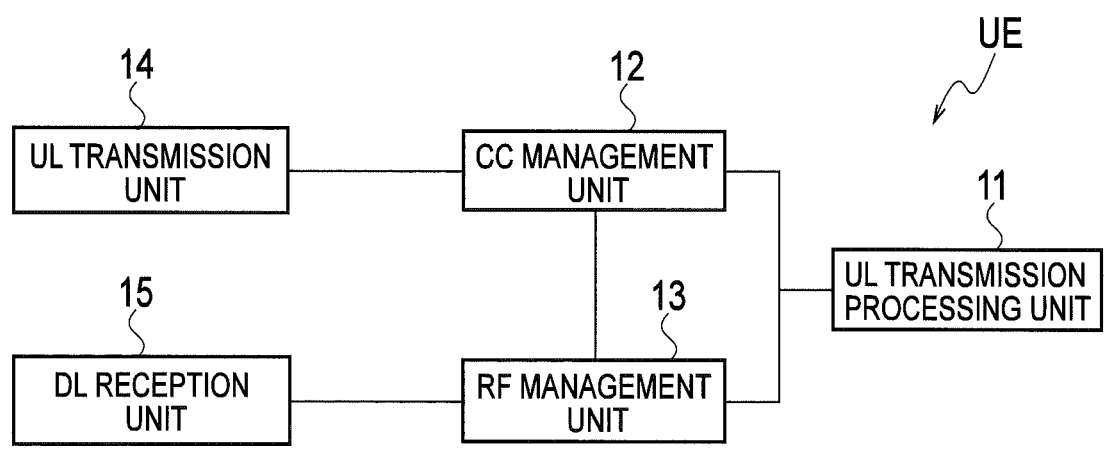
FIG. 2 is a functional block diagram of a mobile station according to the first embodiment of the present invention.

As shown in FIG. 2, the mobile station UE includes a UL transmission processing unit 11, a CC management unit 12, a RF management unit 13, a UL transmission unit 14, and a DL reception unit 15.

The UL transmission processing unit 11 is configured to use a CC allocated (scheduled or triggered) over a PDCCH to the mobile station UE at TTI#n by the radio base station eNB, and transmit uplink information at TTI#n+4 corresponding to TTI#n.

In addition, when the mobile station UE executes "Time-Switched UL CA", the UL transmission processing unit 11 is configured to transmit the uplink information in each TTI using only one CC.

The CC management unit 12 is configured to manage CCs used in CA and the RF management unit 13 is configured to manage bands used in "Inter-band CA".

The UL transmission unit 14 is configured with a transmitter and the DL reception unit 15 is configured with a receiver.

Hereinbelow, operation of the UL transmission processing unit 11 according to the embodiment is described with reference to FIG. 3.

Figure 3:
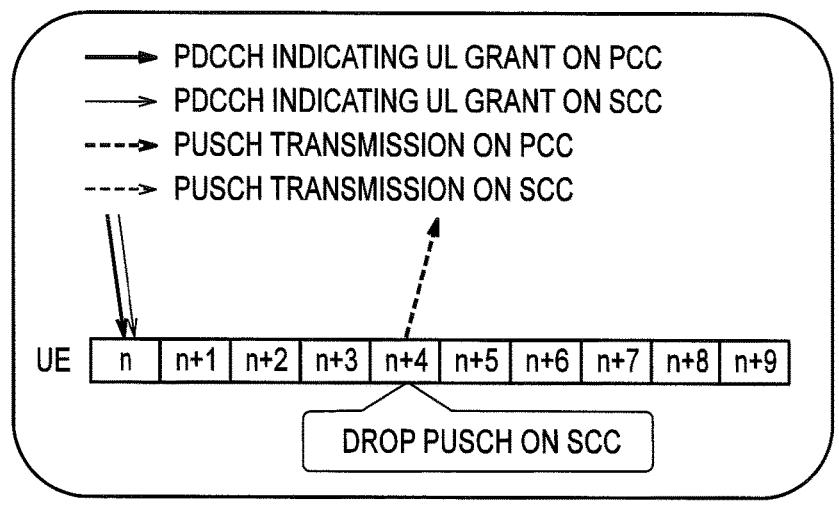
FIG. 3 is a view for illustrating operation of the mobile station according to the first embodiment of the present invention.

As shown in FIG. 3, when acquiring at TTI#n scheduling information on transmission of uplink information #1 in CC#1 and scheduling information on transmission of uplink information #2 in CC#2 via a PDCCH, the UL transmission processing unit 11 is configured to select uplink information to be transmitted at TTI#n+4 based on the priority corresponding to the uplink information #1/#2.

Here, the above-mentioned uplink information includes uplink control information and uplink data, and the priority corresponding to the uplink control information may also be configured to be higher than the priority corresponding to the uplink data.

More specifically, when acquiring at TTI#n scheduling information on transmission of the uplink control information (PDCCH signal) in CC#1 and scheduling information on transmission of the uplink data (PDSCH signal) in CC#2, the UL transmission processing unit 11 may also be configured to select the uplink control information as uplink information to be transmitted at TTI#n+4 and transmit the uplink control information via CC#1 at TTI#n+4.

In addition, the above-mentioned uplink information includes uplink information in a Pcell and uplink information in a Scell, and the priority corresponding to the uplink information in the Pcell may also be configured to be higher than the priority corresponding to the uplink information in the Scell.

More specifically, when acquiring at TTI#n scheduling information on transmission of the uplink information in the Pcell (CC#1) and scheduling information on transmission of the uplink information in the Scell (CC#2) via the PDCCH, the UL transmission processing unit 11 may also be configured to select the uplink information in the Pcell (CC#1) as uplink information to be transmitted at TTI#n+4 and transmit the uplink information via the Pcell (CC#1) at TTI#n+4.

In addition, the above-mentioned uplink information includes new uplink data and retransmitted uplink data, and the priority corresponding to the retransmitted uplink data may also be configured to be higher than the priority corresponding to the new uplink data.

More specifically, when acquiring at TTI#n the scheduling information on transmission of the new uplink data in CC#1 and the scheduling information on transmission of the retransmitted uplink data in CC#2 via the PDCCH, the UL transmission processing unit 11 may also be configured to select the retransmitted uplink data as uplink information to be transmitted at TTI#n+4, and transmit the retransmitted uplink data via CC#2 at TTI#n+4.

In addition, the above-mentioned uplink information includes uplink information autonomously transmitted by the mobile station UE and uplink information transmitted under the instruction of the radio base station eNB, and the priority corresponding to the uplink information transmitted under the instruction of the radio base station eNB may also be configured to be higher than the priority corresponding to the uplink information autonomously transmitted by the mobile station UE.

More specifically, when acquiring at TTI#n scheduling information on transmission of the uplink information autonomously transmitted in CC#1 by the mobile station UE and scheduling information on transmission of the uplink information transmitted in CC#2 under the instruction of the radio base station eNB, the UL transmission processing unit 11 may also be configured to select the uplink information transmitted under the instruction of the radio base station eNB as uplink information to be transmitted at TTI#n+4, and transmit the uplink information transmitted under the instruction of the radio base station eNB via CC#2 at TTI#n+4.

Here, it is assumed that uplink information autonomously transmitted by the mobile station UE includes a CQI (Channel Quality Indicator), an SRS (Sounding Reference Signal), and the like.

On the one hand, it is assumed that uplink information transmitted under the instruction of the radio base station eNB includes uplink information scheduled via the PDCCH, and the like.

In addition, the above-mentioned uplink information includes uplink information transmitted on a periodic basis or uplink information transmitted on a non-periodic basis, and the priority corresponding to the uplink information transmitted on a non-periodic basis may also be configured to be higher than the priority corresponding to the uplink information transmitted on a periodic basis.

More specifically, when acquiring at TTI#n scheduling information on transmission of the uplink information transmitted in CC#1 on a periodic basis and scheduling information on transmission of the uplink information transmitted in CC#2 on a non-periodic basis via the PDCCH, the UL transmission processing unit 11 may also be configured to select the uplink information transmitted on a non-periodic basis as uplink information to be transmitted at TTI#n+4 and transmit the uplink information transmitted on a non-periodic basis via CC#2 at TTI#n+4.

Here, it is assumed that uplink information transmitted on a periodic basis includes a CQI or an SRS transmitted on a periodic basis and the like. In addition, it is assumed that uplink information transmitted on a non-periodic basis includes a signal transmitted in a RACH procedure, an SRS transmitted on a non-periodic basis, uplink data transmitted via a PUSCH, and the like.

Accordingly, a selection can be made on which of CC#1 and CC#2 is to be used to transmit uplink information at TTI#n+4.

Here, specifically, the UL transmission processing unit 11 may be configured to generate uplink information (MAC- PDU) in a MAC (Media Access Control) layer and not to transmit the uplink information (MAC-PDU) in a physical layer.

Preferably, even in such a case, the UL transmission processing unit 11 is configured to execute retransmission of a following HARQ as usual.

In addition, the UL transmission processing unit 11 may be configured to retain uplink information (MAC-PDU) which has not been transmitted (selected) at TTI#n+4, without discarding it.

Note that the UL transmission processing unit 11 is configured to monitor a delivery confirmation result on the uplink information (MAC-PDU) transmitted via a PHICH (Physical Hybrid-ARQ Indicator Channel) or an "UL grant (for Adaptive retransmission)".

Hereinbelow, operation of the mobile station UE according to the embodiment is described with reference to FIG. 4.

Figure 4:
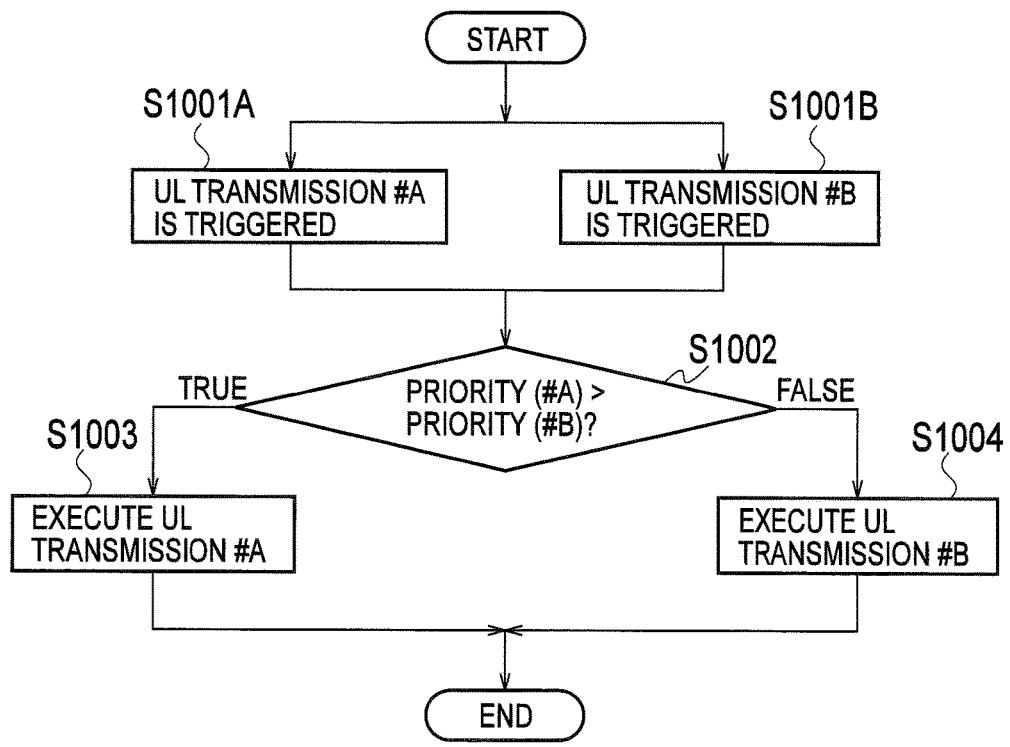
FIG. 4 is a flowchart showing the operation of the mobile station according to the first embodiment of the present invention.
Figure 5:
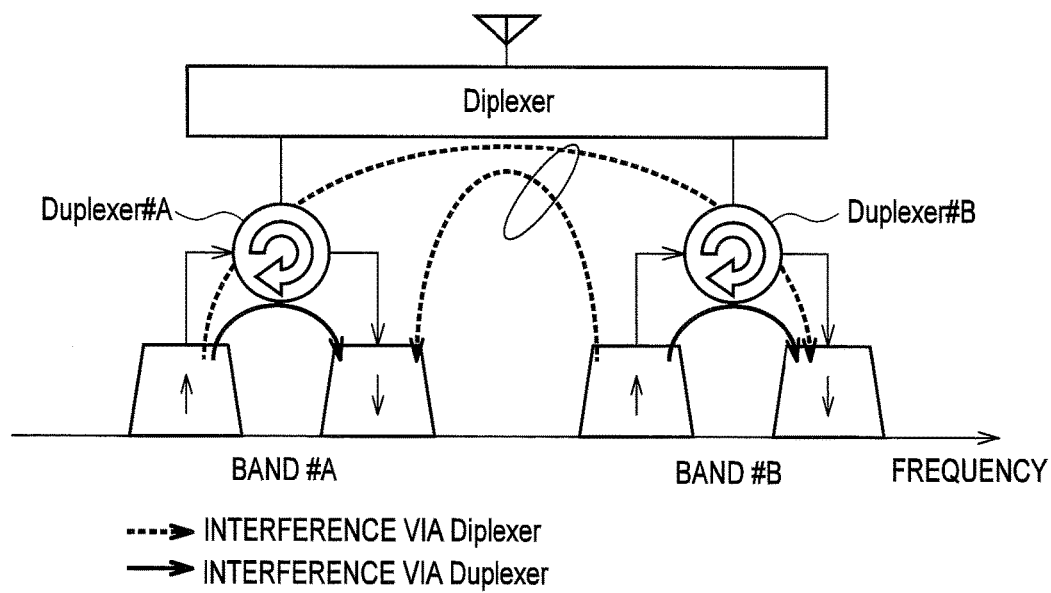
FIG. 5 is a view for illustrating a conventional mobile communication system.
Figure 6:
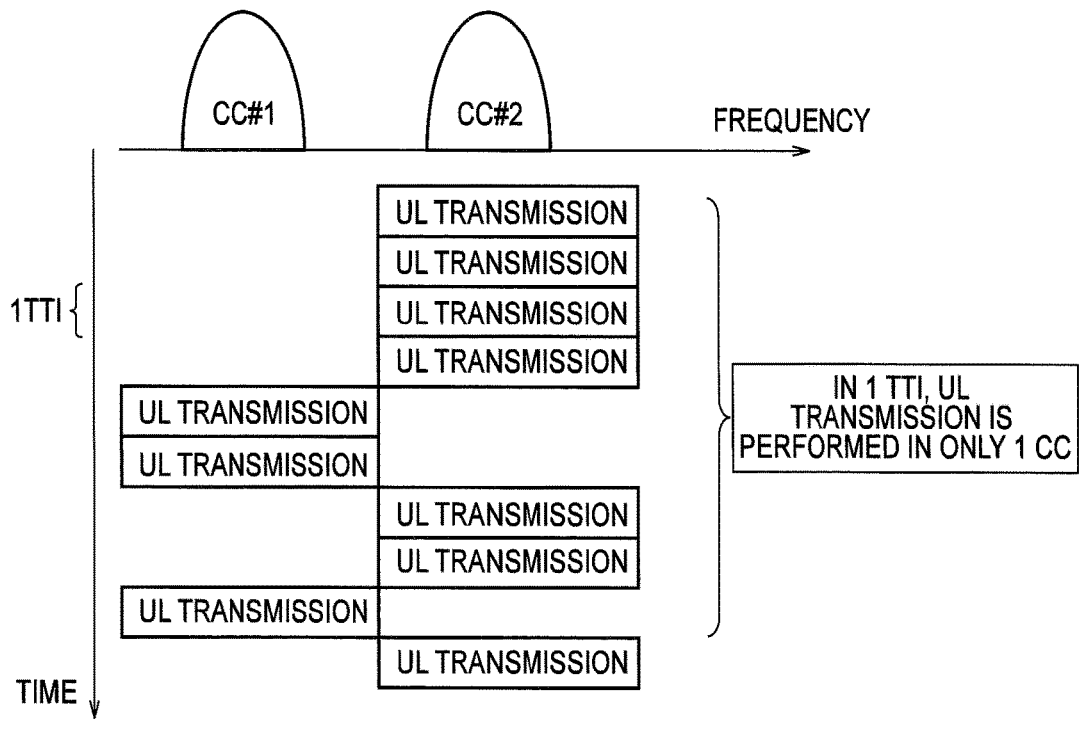
FIG. 6 is another view for illustrating the conventional mobile communication system.
Figure 7:
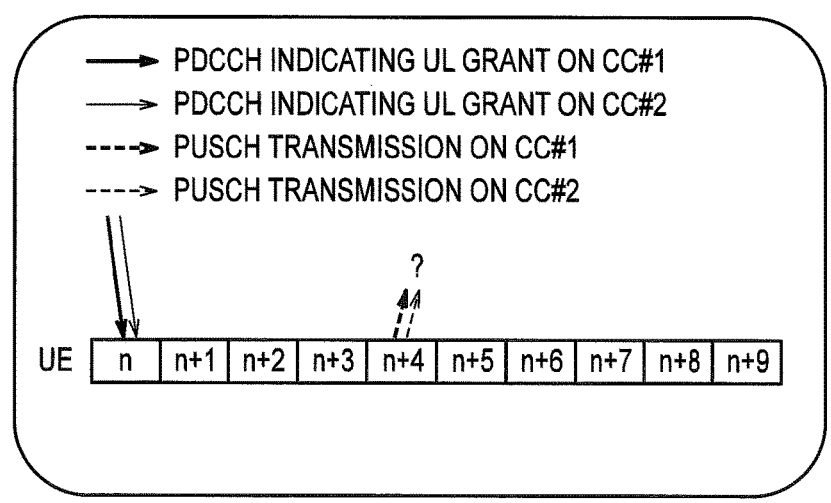
FIG. 7 is a view for illustrating problems of the conventional mobile communication system.

As shown in FIG. 4, when transmission of uplink information #A is triggered in step S1001A and transmission of uplink information #B is triggered in step S1001B, that is to say, when the mobile station UE acquires scheduling information on transmission of the uplink information #A via CC#1 and scheduling information on transmission of the uplink information #B via CC#2, through the PDCCH, the mobile station UE compares the priority #A corresponding to the uplink information #A with the priority #B corresponding to the uplink information #B in step S1002.

If the priority #A corresponding to the uplink information #A is higher than the priority #B corresponding to the uplink information #B, the mobile station UE executes transmission of the uplink information #A via CC#1 in step S1003 and does not execute transmission of the uplink information #B via CC#2.

On the one hand, if the priority #B corresponding to the uplink information #B is higher than the priority #A corresponding to the uplink information #A, the mobile station UE transmits the uplink information #B via CC#2 in step S1004 and does not execute transmission of the uplink information #A via CC#1.

The mobile communication system according to the embodiment can execute appropriate processing when "Time-Switched UL CA" is executed and even when transmission of uplink information using a plurality of CCs has been scheduled in a same TTI.

The features of the embodiment may also be expressed as follows.

A first feature of the embodiment is summarized as a mobile station UE configured to be able to carry out CA (carrier aggregation) using a plurality of CCs (component carriers) in an uplink with a radio base station eNB, including: a UL transmission processing unit 11 (a uplink transmission processing unit) configured to transmit uplink information at TTI#n+4 (second transmission time interval) corresponding to TTI#n, using a CC allocated over a PDCCH (a Physical Downlink Control Channel) to the mobile station UE at TTI#n (first transmission time interval) by the radio base station eNB. Here, the UL transmission processing unit 11 is configured to transmit the uplink information at each of TTIs using only one CC, and when a plurality of CCs is allocated at TTI#n, the UL transmission processing unit 11 is configured to select uplink information to be transmitted at TTI#n+4, based on a priority corresponding to the uplink information to be transmitted using each of the plurality of CCs allocated.

In the first feature of the embodiment, the UL transmission processing unit 11 may be configured to retain uplink information which has not been selected as uplink information to be transmitted at TTI#n+4, without discarding the uplink information.

In the first feature of the embodiment, the above-mentioned uplink information may include uplink control information and uplink data, and the priority corresponding to the uplink control information may be configured to be higher than the priority corresponding to the uplink data.

In the first feature of the embodiment, the above-mentioned uplink information may include uplink information in a Pcell (a primary cell) and uplink information in a Scell (a secondary cell), and the priority corresponding to the uplink information in the Pcell may be configured to be higher than the priority corresponding to the uplink information in the Scell.

In the first feature of the embodiment, the above-mentioned uplink information may include new uplink data and retransmitted uplink data, and the priority corresponding to the retransmitted uplink data may be configured to be higher than the priority corresponding to the new uplink data.

In the first feature of the embodiment, the above-mentioned uplink information may include uplink information autonomously transmitted by the mobile station UE and uplink information transmitted under the instruction of the radio base station eNB, and the priority corresponding to the uplink information transmitted under the instruction of the radio base station eNB may be configured to be higher than the priority corresponding to the uplink information autonomously transmitted by the mobile station UE.

In the first feature of the embodiment, the above-mentioned uplink information may include uplink information transmitted on a periodic basis and uplink information transmitted on a non-periodic basis, and the priority corresponding to the uplink information transmitted on the non-periodic basis may be configured to be higher than the priority corresponding to the uplink information transmitted on the periodic basis.

In addition, in the embodiment described above, while the description is given with the uplink information triggered by the PDCCH addressed to the mobile station UE as an example, the present invention is also applicable to transmission of other uplink information, such as uplink information transmission of which is autonomously triggered by a mobile station UE without passing through a PDCCH (Physical Downlink Control Channel).

It is assumed that the uplink information transmission of which is autonomously triggered by the mobile station UE includes uplink information transmitted via a PRACH (Physical Random Access Channel), an SRS (Sounding Reference Signal) or uplink information transmitted via a PUCCH (Physical Uplink Control Channel), and the like.

A first feature of the embodiment is summarized as a mobile station UE configured to be able to carry out CA (carrier aggregation) using a plurality of CCs (component carriers) in an uplink with a radio base station eNB, including: a UL transmission processing unit 11 configured to transmit uplink information at TTI#nx+4 (transmission time interval). Here, the UL transmission processing unit 11 is configured to transmit the uplink information at each of TTIs using only one CC, and when transmission of uplink information is triggered in a plurality of CCs, the UL transmission processing unit 11 is configured to select uplink information to be transmitted at TTI#n+4, based on a priority corresponding to the uplink information to be transmitted using each of the plurality of CCs in which transmission of the uplink information is triggered.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. The ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161912 (filed on Jul. 20, 2012) is incorporated by reference in the present specification.

INDUSTRIAL APPLICABILITY

As described above, according to the present invention, a mobile station capable of executing appropriate processing when "Time-Switched UL CA" is executed and even when transmission of uplink information using a plurality of CCs has been scheduled in the same TTI can be provided.

EXPLANATION OF THE REFERENCE NUMERALS eNB radio mobile station
UE mobile station
11 UL transmission processing unit
12 CC management unit
13 RF management unit
14 UL transmission unit
15 DL reception unit

The invention claimed is:

1. A mobile station that carries out carrier aggregation using a plurality of component carriers in an uplink with a radio base station, comprising:
a transmitter that transmits uplink information at transmission time intervals, wherein
when the mobile station executes time-switched uplink carrier aggregation, the transmitter transmits the uplink information at each of the transmission time intervals using only one component carrier; and
a processor that, when transmission of uplink information is triggered in a plurality of component carriers to be transmitted at a same transmission time interval, selects uplink information to be transmitted at the same transmission time interval, based on a priority corresponding to the uplink information to be transmitted using each of the plurality of component carriers in which transmission of the uplink information is triggered.

2. The mobile station according to claim 1, wherein the uplink information that has not been selected as uplink information to be transmitted at the transmission time intervals is retained without discarding the uplink information.

3. The mobile station according to claim 1, wherein
the uplink information includes uplink control information and uplink data, and
the priority corresponding to the uplink control information is higher than the priority corresponding to the uplink data.

4. The mobile station according to claim 1, wherein
the uplink information includes uplink information in a primary cell and uplink information in a secondary cell, and
the priority corresponding to the uplink information in the primary cell is higher than the priority corresponding to the uplink information in the secondary cell.

5. The mobile station according to claim 1, wherein
the uplink information includes new uplink data and retransmitted uplink data, and
the priority corresponding to the retransmitted uplink data is higher than the priority corresponding to the new uplink data.

6. The mobile station according to claim 1, wherein
the uplink information includes uplink information autonomously transmitted by the mobile station and uplink information transmitted under the instruction of the radio base station, and
the priority corresponding to the uplink information transmitted under the instruction of the radio base station is higher than the priority corresponding to the uplink information autonomously transmitted by the mobile station.

7. The mobile station according to claim 1, wherein
the uplink information includes uplink information transmitted on a periodic basis and uplink information transmitted on a non-periodic basis, and
the priority corresponding to the uplink information transmitted on the non-periodic basis is higher than the priority corresponding to the uplink information transmitted on the periodic basis.

8. The mobile station according to claim 2, wherein
the uplink information includes uplink control information and uplink data, and
the priority corresponding to the uplink control information is higher than the priority corresponding to the uplink data.

9. The mobile station according to claim 2, wherein
the uplink information includes uplink information in a primary cell and uplink information in a secondary cell, and
the priority corresponding to the uplink information in the primary cell is higher than the priority corresponding to the uplink information in the secondary cell.

10. The mobile station according to claim 2, wherein
the uplink information includes new uplink data and retransmitted uplink data, and
the priority corresponding to the retransmitted uplink data is higher than the priority corresponding to the new uplink data.

11. The mobile station according to claim 2, wherein
the uplink information includes uplink information autonomously transmitted by the mobile station and uplink information transmitted under the instruction of the radio base station, and
the priority corresponding to the uplink information transmitted under the instruction of the radio base station is higher than the priority corresponding to the uplink information autonomously transmitted by the mobile station.

12. The mobile station according to claim 2, wherein
the uplink information includes uplink information transmitted on a periodic basis and uplink information transmitted on a non-periodic basis, and
the priority corresponding to the uplink information transmitted on the non-periodic basis is higher than the priority corresponding to the uplink information transmitted on the periodic basis.

* * * * *